UNITED STATES PATENT OFFICE.

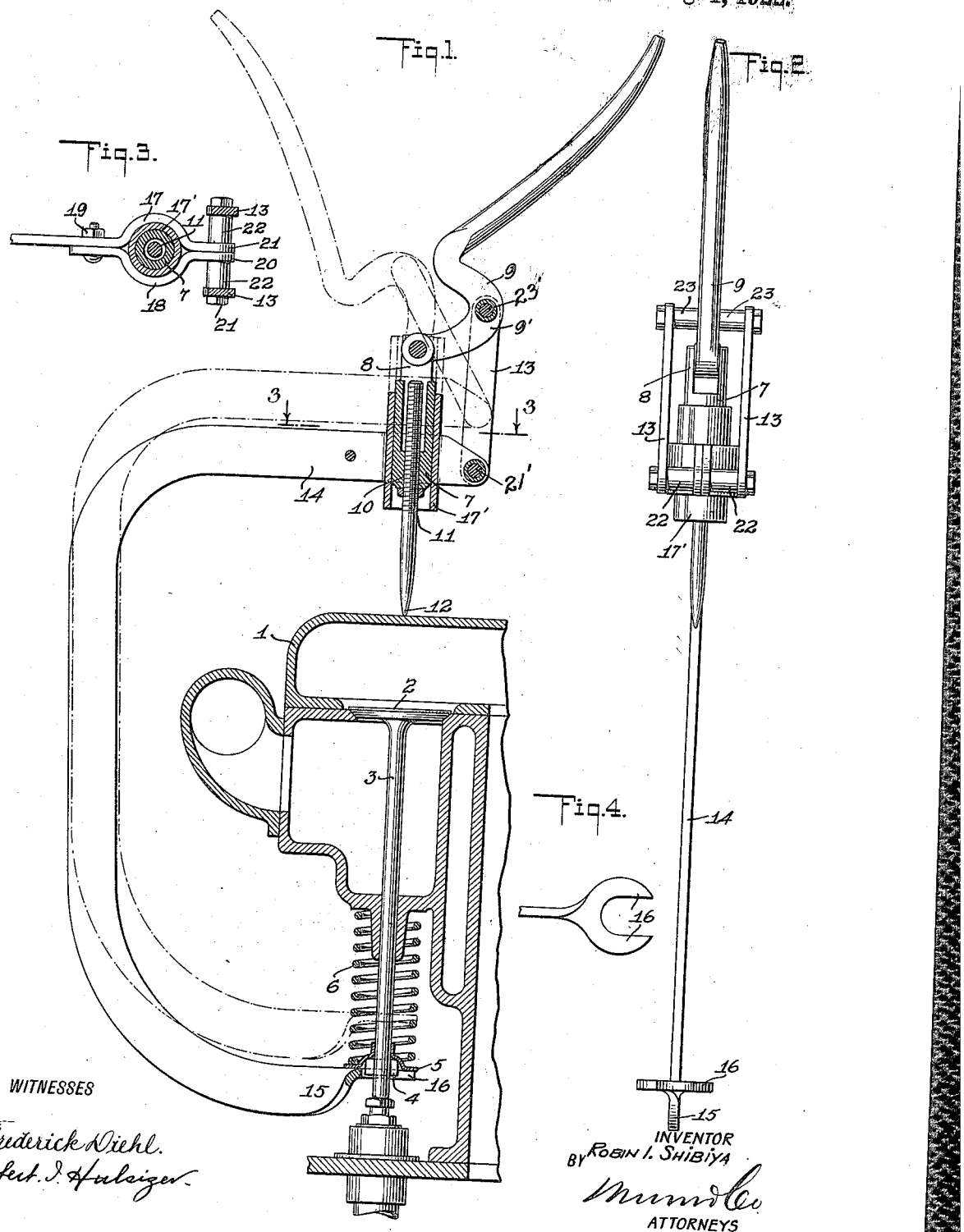

ROBIN ICH SHIBIYA, OF OMAHA, NEBRASKA.

VALVE LIFTER.

1,424,683.   Specification of Letters Patent.   Patented Aug. 1, 1922.

Application filed February 9, 1921. Serial No. 443,634.

*To all whom it may concern:*

Be it known that I, ROBIN I. SHIBIYA, a subject of the Emperor of Japan, and a resident of Omaha, in the county of Douglas and State of Nebraska, have invented a new and Improved Valve Lifter, of which the following is a full, clear, and exact description.

This invention relates to devices for aiding in the removal of the poppet valves of engines, particularly internal combustion engines; and has for an object the provision of a simple and efficient device which can be readily and simply applied to an internal combustion engine in the smallest possible space to effect the removal of the valves therefrom.

Another object is the provision of a device which can be adjusted for different-sized engines in a very easy manner.

A further object resides in the provision of a device in which the action of removing a valve against the force of a valve spring is effected by the use of a minimum amount of force.

A still further object resides in the particular construction and arrangement of parts hereinafter described and claimed and shown in the accompanying drawings.

The invention is illustrated in the drawings, of which—

Figure 1 is a side view partially in section showing the device applied to the cylinder block of an automobile engine;

Figure 2 is an end view of the device;

Figure 3 is a section taken on the line 3—3 of Figure 1; and

Figure 4 is a detail of the end of the spring-lifting arm.

The preferred embodiment of my device as shown in the drawings is adapted for application to the cylinder block of an engine, such as an automobile engine. This portion of the engine comprises a cylinder head 1 in which a valve 2 having a valve stem 3 is disposed in a well-known manner. The lower end of the valve stem is provided with a pin 4 passing therethrough which serves to restrain the movement thereon of a washer 5. Between the washer 5 and the cylinder casing a coiled spring 6 extends. This coiled spring has the effect of bearing down on the washer and therethrough on a valve stem to hold the valve 2 seated.

In order to remove the valve from the cylinder block for regrinding or other repairs, it is necessary to remove the cylinder head 1 to lift the valve. In order to lift the valve, the pressure of the spring 6 must be removed from the valve stem 3. To do this, it is customary to provide some mechanism for lifting the washer 5 and the spring 6 against the force of the spring so that the washer is removed from the pin 4, whereby the pin 4 can be removed from the stem 3. When this pin is thus removed, the stem is freed from the restraining action of the spring 6 and the valve, therefore, can be removed freely from its seat.

To effect this object, I have provided a metallic plug 7 which is provided at one end with spaced yoke-shaped lug members 8 between and on which an operating handle or lever 9 is pivoted. The lower end of this plug 7 is bored as at 10 and provided with a threaded portion through which a threaded pin or rod 11 extends. The lower end of this rod is tapered to a point 12 adapted to rest on the top of the cylinder block 1, or may extend to the top of valve 2 when the cylinder head is removed. Adjacent the pivot point of the handle 9 the handle is flared and curved as at 9′, and at this point a pair of links 13 are pivotally connected in a manner hereinafter to be described. At the other end these links are connected to a spring-lifting arm 14, the lower outer end 15 of which is adapted to engage the washer 5. This end 15 is in the form of two spaced extending wing portions 16 which are adapted to be disposed on opposite sides of the stem 3 and pin 4 beneath the washer 5. The plug 7, to which the lever 9 is connected, is surrounded by a sleeve 17′ which is adapted to slide along the plug. This sleeve is embraced by a portion, such as 17, of the arm 14 on one side, and on the other, by a curved portion 18 of a metallic bar which is at one end bolted as at 19 to the arm 14 and at the other end 20 is disposed adjacent the outer end 21 of the arm 14. The ends 20 and 21 above mentioned are pivotally connected to a bolt 21′ and spaced by sleeves 22 surrounding said bolt from the above-mentioned links 13. The parts 17 and 18, 20 and 21 may be made in one piece, if desired. The upper ends of the links 13 are connected to a plate 23′ which is also pivotally connected to the above-mentioned portion of the lever 9 and are spaced apart by sleeves 23, as shown particularly in Figure 2. In this way the movement of the handle or lever 9 will effect a balanced movement of the sleeve 17' along the plug 7 and thereby carry with it the arm 14.

In the operation of the device, the first step requires that the pin 12 be so adjusted within the plug 7 that the plug 7 will be spaced the proper distance from the top of the cylinder block. When in this proper position, with the lever 9 in the position shown in full lines in Figure 1, the lower end 15 of the valve spring lifting arm 14 should be in position beneath the washer 5 when the washer is in the normal position bearing against the pin 4. Assuming that the wing portions 16 of the arm 14 are disposed on opposite sides of the pin 4 and beneath the washer 5, then the movement of the lever 9 from the position shown in full lines in Figure 1 to the dotted position shown in the same figure, will cause an upward pull on the links 13 and therethrough on the sleeve 17' and the arm 14 which is pulled upwardly. The upward pull on the link 13 is counterbalanced by a downward thrust at the pivotal point of the lever 9 on the plug 7 which, therefore, forces the pin 12 against the top of the cylinder block and which is, therefore, firmly held thereagainst.

It will be noticed, therefore, that the line of action of the resultant force on the spring is directly in line with the axis of the spring and that the supporting reaction of the device on the cylinder head through the pin 11 is also in line with the axis of the valve stem 3 and the spring 6, whereby uniform concentrated force is applied along the same line. To this end it will be noticed that the pin 11 is disposed on the cylinder block directly in line with the axis of the stem 3 and the spring 6.

What I claim is:

A valve lifter for automobile engines, which comprises a threaded pin to be placed on top of the cylinder block, a plug having a threaded bore with which the pin adjustably engages, a slidable sleeve surrounding the plug, a pivoted lever connected to said plug, an arm connected to the sleeve and extending around the cylinder head, the lower end of the arm adapted to engage the valve spring, said arm having an aperture, a bolt passing through said aperture, a pair of sleeves surrounding the bolt on opposite sides of the arm, a pair of links disposed on the bolt adjacent the ends of the sleeves, the other ends of the links being apertured, a second bolt passing through the apertures in said links and through an aperture in the pivoted arm, and sleeves on the second bolt disposed between the links and the arm to space the links with respect to the arm, this combination of parts resulting in a balanced movement of the sleeve along the plug.

ROBIN ICH SHIBIYA.